(12) United States Patent
Smith

(10) Patent No.: US 9,111,168 B2
(45) Date of Patent: Aug. 18, 2015

(54) METHOD AND SYSTEM FOR RESOLUTION CONVERSION OF MAGNETIC INK CHARACTER RECOGNITION (MICR) CONTENT

(71) Applicant: Mark A. Smith, New York, NY (US)

(72) Inventor: Mark A. Smith, New York, NY (US)

(73) Assignee: XEROX CORPORATION, Norwalk, CT (US)

( * ) Notice: Subject to any disclaimer, the term of this patent is extended or adjusted under 35 U.S.C. 154(b) by 195 days.

(21) Appl. No.: 13/644,932

(22) Filed: Oct. 4, 2012

(65) Prior Publication Data

US 2014/0099036 A1    Apr. 10, 2014

(51) Int. Cl.
*G06K 9/00* (2006.01)
*G06K 9/18* (2006.01)

(52) U.S. Cl.
CPC .................................... *G06K 9/186* (2013.01)

(58) Field of Classification Search
None
See application file for complete search history.

(56) References Cited

U.S. PATENT DOCUMENTS

| | | | | |
|---|---|---|---|---|
| 5,729,621 | A * | 3/1998 | Marshall et al. | 382/139 |
| 6,975,411 | B2 * | 12/2005 | Foster et al. | 358/1.1 |
| 7,165,723 | B2 * | 1/2007 | McGlamery et al. | 235/449 |
| 7,330,288 | B2 * | 2/2008 | Foster et al. | 358/1.9 |
| 2004/0190027 | A1 * | 9/2004 | Foster et al. | 358/1.9 |
| 2006/0106717 | A1 * | 5/2006 | Randle et al. | 705/45 |
| 2006/0186194 | A1 * | 8/2006 | Richardson et al. | 235/379 |
| 2011/0206266 | A1 * | 8/2011 | Faulkner et al. | 382/139 |

* cited by examiner

*Primary Examiner* — Hadi Akhavannik
(74) *Attorney, Agent, or Firm* — Pillsbury Winthrop Shawn Pittman, LLP

(57) ABSTRACT

A method and a system for resolution conversion of Magnetic Ink Character Recognition (MICR) content in an image are provided. The method is implemented in a computer system comprising one or more processors configured to execute one or more computer program modules. The method includes receiving image data of the image, the image data having a plurality of image planes in which one plane is a MICR image plane, wherein the plurality of image planes have essentially the same resolution; and converting the resolution of the MICR image plane to a resolution of a MICR print engine different from the remaining image planes.

28 Claims, 5 Drawing Sheets

UNTUNED
SUBSTITUTION
CHARACTER

TUNED
SUBSTITUTION
CHARACTER

METHOD AND SYSTEM FOR RESOLUTION CONVERSION OF MAGNETIC INK CHARACTER RECOGNITION (MICR) CONTENT

BACKGROUND

1. Field

The present disclosure relates to a system and a method for resolution conversion of Magnetic Ink Character Recognition (MICR) content in an image.

2. Description of Related Art

The architecture of continuous feed (CF) direct marking (DM) printing systems includes the use of multiple print heads (or marking stations) distributed into several color print head modules along the printing path. These multiple print heads are distributed over a long print zone to print the desired image. An exemplary continuous feed printing system may have as many as six color modules with four print units per color module incorporating fourteen print heads. Also, the continuous feed printing system prints on a band, a web or a roll of paper/media as compared to a sheet printing system which prints on discrete sheets of media.

Magnetic Ink Character Recognition (MICR) technology is generally well-known. MICR inks contain a magnetic pigment or a magnetic component in an amount sufficient to generate a magnetic signal strong enough to be readable via a MICR reader device. Generally, the ink is used to print all or a portion of a document, such as checks, bonds, security cards, etc. For example, most checks exhibit an identification code area, usually at the bottom of the check. The characters of this identification code are usually MICR encoded. The document may be printed with a combination of MICR-readable ink and non-MICR-readable ink, or with just MICR-readable ink. The document thus printed is then exposed to an appropriate source or field of magnetization, at which time the magnetic particles become aligned as they accept and retain a magnetic signal. The document can then be read by passing it through a reader device, which detects or "reads" the magnetic signal of the MICR imprinted characters.

In one MICR implementation for the continuous feed printing system, a set of aqueous ink print heads are added to an otherwise solid inkjet printing engine having solid inkjet print heads. The aqueous ink print head technology can be different from the solid inkjet print head technology. For example, the solid inkjet print heads may be clocked at a fixed frequency no matter how fast the web moves while the MICR print heads are clocked at a rate proportional to the web speed. In another example, the solid inkjet print heads may be manufactured with a different number of nozzles per inch than the MICR print heads. Due to these differences in the print head technologies involved, the aqueous ink print heads operate at a different resolution than that of the solid inkjet print heads. Additionally, for each unique web speed, images printed with the solid inkjet print heads change resolution but those printed with the aqueous ink print heads do not. The web speed, as used herein, refers to the speed at which a roll (or a web) of media (or paper) is being fed into a continuous feed printing system.

The problem, therefore, is to print an N-separation image, where one of the separations is the MICR separation, at all web speeds of the continuous feed printing system.

SUMMARY

In one embodiment, a method for resolution conversion of Magnetic Ink Character Recognition (MICR) content in an image is provided. The method is implemented in a computer system comprising one or more processors configured to execute one or more computer program modules. The method includes receiving, at a processor, image data of the image, the image data having a plurality of image planes in which one plane is a MICR image plane, wherein the plurality of image planes have essentially the same resolution; and converting, using the processor, the resolution of the MICR image plane to a resolution of a MICR print engine different from the remaining image planes.

In another embodiment, a system for resolution conversion of Magnetic Ink Character Recognition (MICR) content in an image is provided. The system includes at least one processor configured to: receive image data of the image, the image data having a plurality of image planes in which one plane is a MICR image plane, wherein the plurality of image planes have essentially the same resolution; and convert the resolution of the MICR image plane to a resolution of a MICR print engine different from the remaining image planes.

Other objects, features, and advantages of one or more embodiments will become apparent from the following detailed description, and accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

The present disclosure proposes a print engine image path that accepts an N-separation image, where one of the separations is the Magnetic Ink Character Recognition (MICR) separation. This is the separation that contains the MICR characters to be printed by the print engine with the special MICR or aqueous ink print heads and needs to be marked at a different resolution. The print engine image path implements pattern matching hardware (or firmware or software) that detects the specific MICR characters at the RIP resolution, which is the same resolution as all of the other separations in the image.

When a given character is detected, the print engine image path substitutes a proper bitmap/bytemap for that MICR character from a look-up table associated with the print engine's current web speed. There is a unique lookup table of characters for each web speed where the MICR plane is Raster Image Processed (RIPed) to different resolutions for different web speeds. As will be clear from the discussions below, in one embodiment, MICR characters in the look-up table may be further custom tuned, for example, by modifying their pixel values for optimal or improved magnetic readability.

Figure 1:
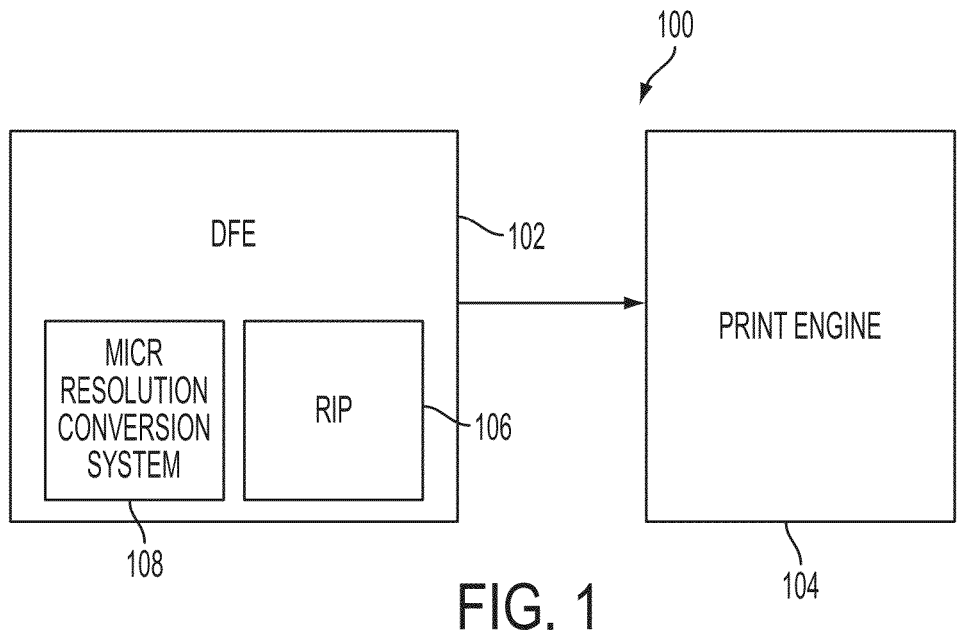
FIG. 1 shows an exemplary image printing system having a MICR resolution conversion system in accordance with an embodiment of the present disclosure.
Figure 2:
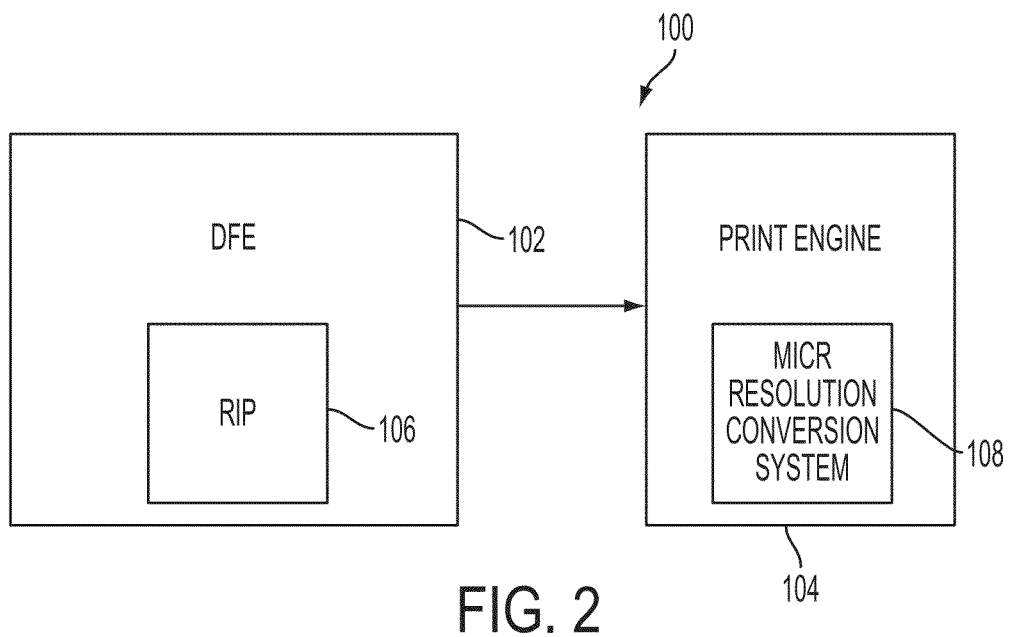
FIG. 2 shows another exemplary image printing system having a MICR resolution conversion system in accordance with another embodiment of the present disclosure.

FIGS. 1 and 2 show exemplary image printing systems, each having a system for resolution conversion of MICR content in the image in accordance with embodiments of the present disclosure.

The image printing system 100 generally includes a Digital Front End (DFE) 102 and a print engine 104 (or marking engine) for applying toner or ink to an image bearing surface, such as a photoreceptor belt or drum, where the belt then transfers the images to a substrate. Alternately, the print engine 104 may apply the toner or ink directly to the substrate.

The DFE 102, as used herein, generally refers to an application that typically takes the form of a general purpose computer executing DFE Application Software, or takes the form of a special purpose computer (such as an Application-Specific Integrated Circuit (ASIC)), as are widely known in the digital document reproduction arts. The DFE is able to load input files (such as Postscript files) composed of images from various input network sources (e.g., a scanner, a digital camera, etc.) and process the files so that they can be output on digital equipment, for example, a small desktop printer or a large digital press. The DFE includes various function processors, e.g., a Raster Image Processor (RIP) 106, image positioning processor, image manipulation processor, color processor, or image storage processor. In some embodiments, the DFE permits a user to set up parameters such as layout, font, color, paper type, or post-finishing options.

The RIP 106 of an image printing system 100 generally converts or rasterizes input files into a print-ready form (e.g., image bitmaps) acceptable by the print engine. The input files may include a page description in a high-level page description language or another bitmap of higher or lower resolution than the output device (e.g., print engine). The print-ready form (e.g., raster image or bitmap/bytemap) produced by the RIP is then sent to the print engine for output. In illustrated embodiments of FIGS. 1 and 2, the RIP 106 is implemented as an integral component of the DFE 102. However, in other embodiments, the RIP 106 may be implemented as a separate system from the DFE 102.

The print engine 104 receives the rasterized image bitmap from the DFE 102 or the RIP 106 and renders the bitmap into a form that controls the image printing process from the exposure device to transferring the print image onto the image bearing surface, such as a photoreceptor belt or drum. The print engine 104 may mark xerographically; however, it will be appreciated that other marking technologies may be used, for example by ink jet marking, ionographically marking or the like. The print engine 104 may be operatively connected one or more sources of printable substrate media, an output path and a finishing system. The print engine 104 may be a multi-color engine having a plurality of imaging/development subsystems that are suitable for producing individual color images. A stacker device may also be provided for the print engine 104 as known in the art. The finishing system applies features such as protection, glossing, or binding to the prints. The finishing system may be implemented as an integral component of the image printing system, or as a separate system through which prints are fed after they are printed.

The DFE 102 is configured to receive an input job or jobs. The DFE 102 is configured to output images of the received jobs having color signals intended to be printed. The received job may include images as part of its content. The DFE 102 produces "N" separations of the content of each received page image in which one separation is for the MICR content and N−1 separations are for the balance of the image content (e.g., CMYK content). The DFE generates all separations at the same resolution (i.e., RIP resolution). The RIP 106 is configured to Raster Image Process (RIP) the image containing MICR content and CMYK content.

Figure 3:
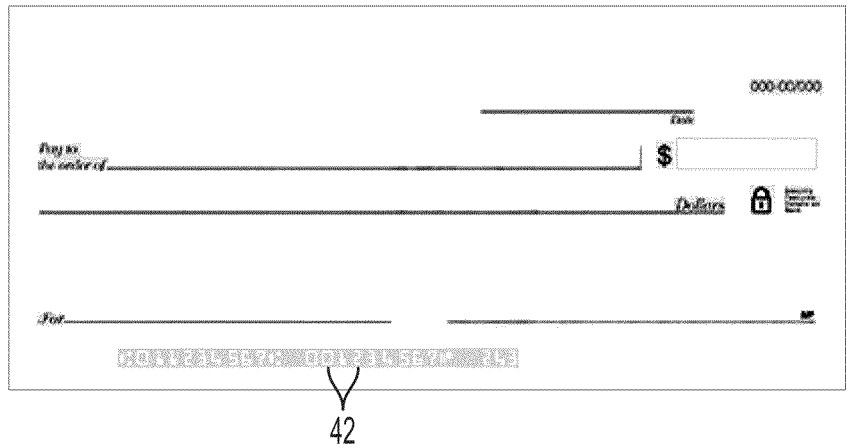
FIG. 3 shows CMYK image content of a N-separation image in accordance with an embodiment of the present disclosure.
Figure 4:
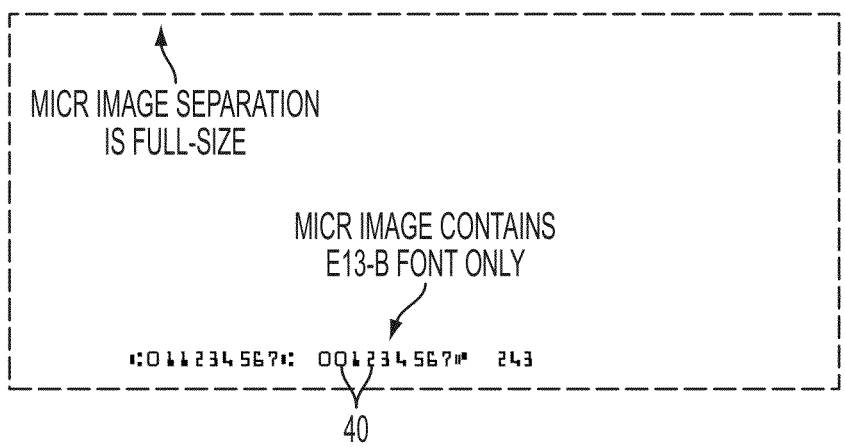
FIG. 4 shows MICR image content of the N-separation image in accordance with an embodiment of the present disclosure.

For example, DFE 102 may produce five separations of an exemplary image (not shown). CMYK image content of the exemplary five-separation image is shown in FIG. 3, while MICR image content of the exemplary five-separation image is shown in FIG. 4. CMYK image content includes Cyan (C) image content, Magenta (M) image content, Yellow (Y) image content, and Black (K) image content. Cyan image content, Magenta image content, Yellow image content, Black (K) image content and MICR image content are each on one of the five image separations. That is, there are four separations or image planes (one for each of Cyan (C), Magenta (M), Yellow (Y), and Black (K)) for the CMYK content. The CMYK image planes or separations of FIG. 3 and MICR image plane or separation of FIG. 4 are full-size images.

The characters of the MICR image plane or separation are created with MICR fonts (e.g., E-13B font or CMC-7 font) and are known as MICR characters, which are printed with MICR toner or ink. MICR Toner is a specialty toner which provides the magnetic charge, allowing the MICR line to be read. The combination of toner/ink and fonts create the machine readable MICR line. MICR toner or ink is often used for printing documents that may be read by automated high-speed scanners, such as, for example, the printing of routing numbers on personal checks.

The MICR image plane or separation of FIG. 4 includes E13-B font MICR characters. For example, such MICR characters appear at the bottom of checks or financial documents.

An output from the image printing system has these images (i.e., CMYK image planes or separations of FIG. 3 and MICR image plane or separation of FIG. 4) superimposed on each other. For example, when these images are superimposed on each other, MICR characters 40 of MICR image plane or separation of FIG. 4 fit into the holes 42 of CMYK image planes or separations of FIG. 3.

The print engine 104 is configured to accept the N-separation image from the DFE 102 or the RIP 106. RIP operates at a resolution appropriate for a solid ink jet (e.g., CMYK) print head. For example, RIP produces a 600×390 resolution image. When this image is printed at a certain web speed, 600 dots/inch are printed in one direction or dimension and 390 dots/inch are printed in the other direction.

The print engine 104 also includes MICR print heads. The MICR print heads that are used to produce magnetic ink characters operate at a different resolution than that of the solid ink jet print heads. For example, the MICR print head may be expecting an image having a resolution of 600×600. In such a case, if an image having 600×390 resolution is supplied to the MICR print head, then the resulting image from the MICR print head will not be printed correctly.

The system 108 of the present disclosure provides a technique for converting resolution of the MICR separation from the RIP resolution to the resolution required by the MICR print heads. In one embodiment, as shown in FIG. 1, the system 108 for resolution conversion of MICR content in the image is implemented as a component of the DFE. That is, in the system as shown in FIG. 1, the DFE creates a MICR separation in the alternate resolution by implementing the look-up table scheme itself. This would be done after RIP, but prior to sending the MICR separation to the print engine. In another embodiment, as shown in FIG. 2, the system 108 for resolution conversion of MICR content in the image is implemented as a component of the print engine.

The basic structure and operation of the system 108 in both these embodiments of FIGS. 1 and 2 remain the same.

The system 108 for resolution conversion of MICR content in the image generally includes one or more processors 110 and 114 performing the functions described below and one or more look-up tables 112 and 116. The system 108 is configured to: receive image data of the image, the image data having a plurality of image planes in which one plane is a MICR image plane, wherein the plurality of image planes have essentially the same resolution; and convert the resolution of the MICR image plane to a resolution of a MICR print engine different from the remaining image planes.

Figure 5:
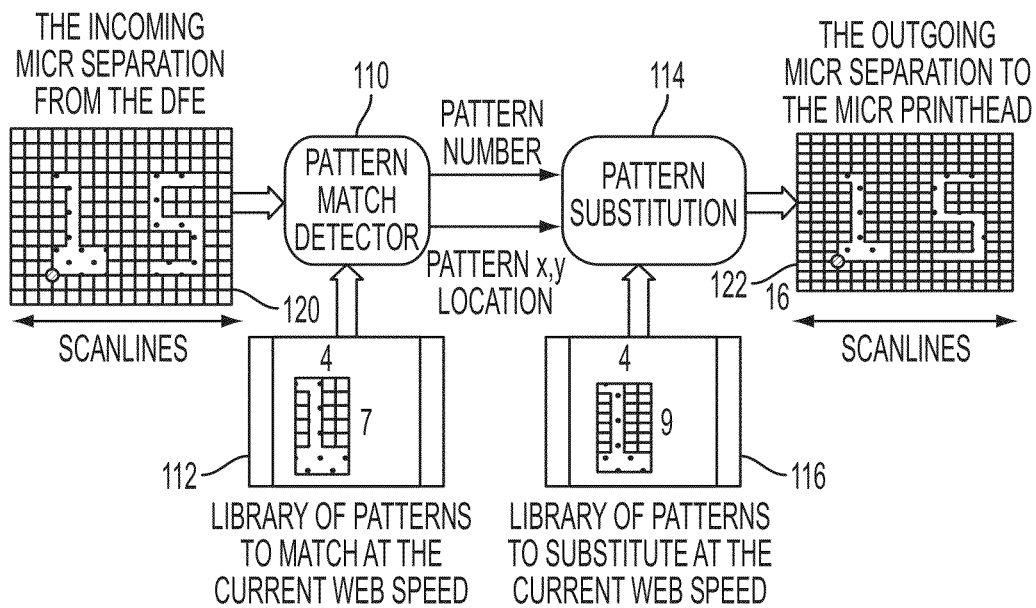
FIG. 5 shows a flow chart of a method for resolution conversion of Magnetic Ink Character Recognition (MICR) content in an image in accordance with an embodiment of the present disclosure.

In one embodiment, referring to FIG. 5, a pattern matching detector, function or processor 110 is configured to receive MICR image plane or separation data from the DFE. The received MICR image plane or separation data is at the RIP resolution and for a given web speed. For example, the received MICR image plane or separation data is at a resolution of 390 by 600 dots per inch (dpi), that is, a horizontal resolution of 390 dpi and a vertical resolution of 600 dpi or a horizontal resolution of 600 dpi and a vertical resolution of 390 dpi.

The MICR image plane may be empty, or it may include one or more MICR characters. In one embodiment, the MICR resolution conversion system 108 is configured to handle an empty input plane by producing an empty output plane at the MICR print engine resolution. In such an embodiment, the MICR image plane is empty and does not include any MICR characters. In another embodiment, as will be explained in detail below, the MICR image plane includes one or more MICR characters that are converted to have the resolution of the MICR print engine.

In the illustrated embodiment of FIG. 5, the MICR characters "1" and "5" in the MICR image plane or separation are each four pixels wide and seven pixels high.

The pattern matching detector 110 is configured to compare at least a portion (e.g., MICR character) of the MICR image plane to a plurality of reference bitmap image patterns stored in the reference look-up table 112. The reference look-up table 112 is a library of bitmap image patterns to match at the current web speed. For example, there are 14 characters in the E-13B MICR font and 15 characters in the CMC-7 MICR font which need to be detected. The look-up table 112 is configured to store reference bitmap image patterns for all the MICR characters in both E-13B MICR font and CMC-7 MICR font.

In one embodiment, all the reference bitmap image patterns stored in the reference look-up table 112 are scaled to match the incoming RIP image (i.e., having MICR image plane or separation data).

The pattern matching detector 110 is configured to detect the MICR character "1 and the location of that character in the received image data. The pattern matching detector 110 is configured to provide a pattern number and its location to a pattern substitution device or function 114.

The pattern number provided by the pattern matching detector 110 includes information about the MICR character, that is, which MICR character is detected. In this illustrated embodiment, for example, the pattern number includes information whether the detected MICR character is "1" or "5."

The location provided by the pattern matching detector 110 includes information about the x and y coordinates of the detected MICR character. This location information may include x and y coordinates of the origin of the detected MICR character. For example, the x and y coordinates of the origin of the detected MICR character "1" is (3, 2) and the x and y coordinates of the origin of the detected MICR character "5" is (10, 2).

The implementation of the pattern matching detector 110, in general, is relatively simple because the number of characters being matched is small. That is, there are 14 characters in the E-13B MICR font and 15 characters in the CMC-7 MICR font. Also, since the printer image path knows exactly how the DFE produces these characters, the properties of these characters are generally well known. Further, since all other job or image content is in the other separations, there is no extraneous content in the MICR plane that may confound matching.

Each of the reference bitmap image patterns stored in the reference look-up table 112 has a corresponding replacement bitmap image pattern. The replacement bitmap image patterns corresponding to the reference bitmap image patterns are stored in the replacement look-up table 116. There is a one-to-one relationship between the reference bitmap image patterns stored in the reference look-up table 112 and replacement bitmap image patterns stored in the replacement look-up table 116. These replacement bitmap image patterns stored in the replacement look-up table 116 are at a resolution corresponding to the print engine's current web speed.

The pattern substitution device or function 114 is configured to access the replacement bitmap image patterns from its library or replacement look-up table 116 and apply it to the (x, y)' location in the separation it builds at MICR print head resolution. As shown in FIG. 5, (x, y)' location is a translation of the character origin from the incoming image's coordinate space to the outgoing image's coordinate space.

For example, the (x, y)' location (i.e., the origin for the MICR character in the outgoing image's coordinate space) of the MICR character "1" is (3, 3) and the (x, y)' location of the MICR character "5" is (10, 3).

In the illustrated embodiment of FIG. 5, the MICR characters "1" and "5" in the outgoing (or output) MICR image plane or separation are each four pixels wide and nine pixels high. For example, the outgoing (or output) MICR image plane or separation data is at a resolution of 600 by 600 dots per inch (dpi), that is, a horizontal resolution of 600 dpi and a vertical resolution of 600 dpi.

In one embodiment, the replacement look-up table 116 includes a set of match/replacement/substitute bitmap patterns for each of the four orientations, each at 90° from the last (i.e., 0°, 90°, 180°, 270°). In another embodiment, the replacement look-up table 116 includes substitute patterns in 1, 2 or 4 orientations depending on: whether or not the pattern substitution function 114 is configured to implement a rotation operation; and whether or not the outgoing resolution of the MICR image separation or plane is to be symmetric (e.g., 600×600) or asymmetric (e.g., 600×470).

The rotation operation generally refers to an operation which rotates the detected MICR character by +90° or −90°. In one embodiment, the pattern substitution function 114 is configured to rotate the detected MICR character by +90° or −90°.

An asymmetric resolution generally has a different resolution in the vertical orientation and horizontal orientation, while the symmetric resolution has a same resolution both in the vertical orientation and in the horizontal orientation. For example, if the outgoing MICR image separation or plane resolution is asymmetric, then match/replacement/substitute bitmap patterns for each of the four orientations (i.e., 0°, 90°, 180°, 270°) are stored in the replacement look-up table 116. On other hand, if the outgoing MICR image separation or plane resolution is symmetric, substitute bitmap patterns in a single orientation are stored in the replacement look-up table 116. This is because the MICR character(s) having a symmetric resolution may be easily rotated (either using a hardware or software). In one embodiment, characters in the replacement look-up table 116 may be custom tuned, for example, by modifying pixel values. The custom tuning of the characters provides optimal or improved magnetic readability at each web speed. That is, the magnetic readers read these characters more reliably when turned this way. The custom tuning capability is achieved by virtue of having separate substitution tables for each web speed. If the image path to the MICR heads is contone, individual pixels may be tuned within the range of 0 to 255.

Figure 7A:
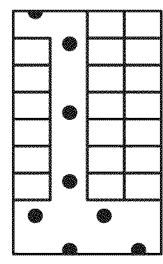
FIGS. 7A and 7B show untuned substitution character and tuned substitution character, respectively, in accordance with an embodiment of the present disclosure.
Figure 7B:
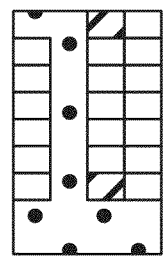

FIGS. 7A and 7B show untuned substitution MICR character and tuned substitution MICR character, respectively, in accordance with an embodiment of the present disclosure. Each pixel in FIG. 7A has a value of either 0 or 255. Optimal or improved magnetic readability of the MICR character at each web speed may be obtained, for example, by having a value of less 255 in some pixels or certain spots. As shown in FIG. 7B, the tuned substitution character has 'grey' values (values between 0 and 255) for some pixels.

Figure 6:
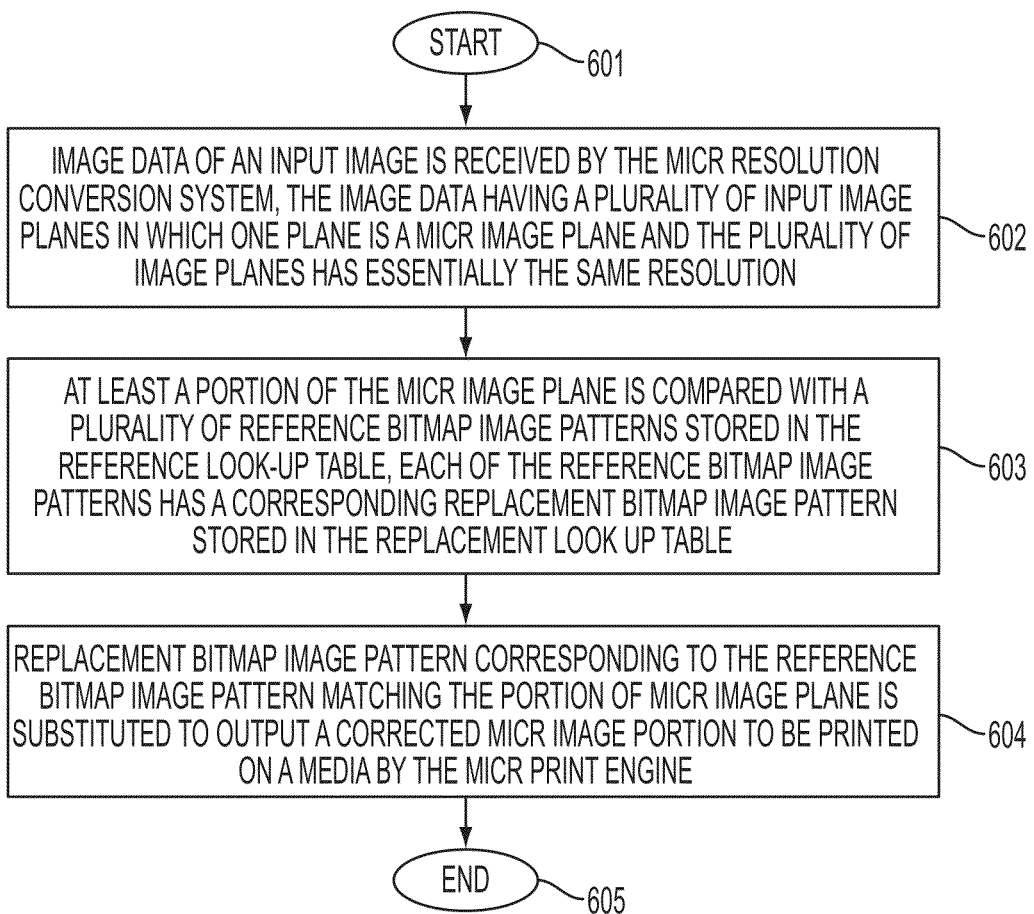
FIG. 6 shows a detailed flow chart of the method for resolution conversion of MICR content in the image in accordance with an embodiment of the present disclosure.

The portion of the received MICR image plane or separation data 120 is 12 pixels high and 16 pixels wide, while the portion of the output MICR image plane or separation data 122 is 16 pixels high and 16 pixels wide. FIG. 6 shows a detailed flowchart summarizing a method 600 for resolution conversion of Magnetic Ink Character Recognition (MICR) content in an image. The method 600 is implemented in a computer system comprising one or more processors configured to execute one or more computer program modules. The method 600 begins at procedure 601.

Referring to FIGS. 1, 2 and 6, at procedure 602, image data of an input image is received by the MICR resolution conversion system 108. In one embodiment, as noted above, the DFE receives the input image, processes the input image and sends the image data of the input image to the MICR resolution conversion system 108. The image data has a plurality of input image planes in which one plane is a MICR image plane. Also, the plurality of image planes has essentially the same resolution (i.e., RIP resolution).

The processors of the MICR resolution conversion system 108 are configured to convert the resolution of the MICR image plane to a resolution of a MICR print head different from the remaining image planes. For example, referring to FIGS. 5 and 6, at procedure 603, at least a portion of the MICR image plane is compared with a plurality of reference bitmap image patterns stored in the reference look-up table 112. Each of the reference bitmap image patterns has a corresponding replacement bitmap image pattern stored in the replacement look-up table 116 (shown in FIG. 5).

In one embodiment, the MICR capability may be added to a continuous feed printing system by attaching a separate MICR print engine to either the input of or the output of a normal CMYK print engine. In such an embodiment, the DFE is configured to drive both the MICR and CMYK print engines, sending only the CMYK separations or image planes to the CMYK print engine and the MICR separations or image planes to the MICR print engine.

Then, at procedure 604, replacement bitmap image pattern corresponding to the reference bitmap image pattern matching the portion of MICR image plane is substituted to output a corrected MICR image portion to be printed on a media by the MICR print head. The method ends at procedure 605.

A display device may be provided to enable the user to control various aspect of the system 108, in accordance with the embodiments disclosed therein. The system 108 includes one or more processors 110 and 114 that execute, and a memory that stores, computer-executable instructions for carrying out the various procedures and performing the various functions described herein.

Some advantages of the system 108 disclosed above include resolution conversion of MICR image information, ability to customize printed MICR characters for optimal or improved magnetic readability based on web speed, etc. Other benefits of the present disclosure include the removal of the dependency of the RIP and marking subsystems. The necessary MICR marking resolution information and bit map structure requirements may be kept in the marking subsystem.

The present disclosure is an improvement over traditional resolution conversion schemes (e.g., nearest neighbor), because the present disclosure deals easily with binary content (i.e., having only 0 or 255 values) in an otherwise contone image, and the present disclosure allows for customization within the conversion so that magnetic readability (rather than optical readability) may be preserved or optimized. Furthermore, the present disclosure gracefully accommodates non-standard and asymmetric resolutions.

While this present disclosure is similar to many pattern matching based binary resolution conversion approaches, this present disclosure is unique in that it is addresses the need for conversion of limited set of characters such as MICR print application. The present disclosure may be applied to other additional marking layer applications, such as gloss layers, where the marking of such layers can be done at different resolutions and the RIPed bitmap can be adjusted.

For the purposes of the discussion in the present disclosure, an "image" is a pattern of physical light or a collection of data representing said physical light and may include characters, words, and text as well as other features such as graphics. A "digital image", by extension, is an image represented by a collection of digital data. An image may be divided into "segments," each of which is itself an image. A segment of an image may be of any size up to and including the whole image.

In a digital image composed of data representing physical light, each element of data may be called a "pixel," which is common usage in the art and refers to a picture element. Each pixel has a location and value. Each pixel value may be one or more bits in a binary form, a gray scale value in a gray scale form, or a set of color space coordinates in a color coordinate form. The binary form, gray scale form, and color coordinate form may each form a two-dimensional array defining an image. An operation performs "image processing" when it operates on an item of data that relates to part of an image.

The "image data" refers to information in a form that can be digitally transmitted or processed. The "printing system" refers to an apparatus arrangement suited to accepting image data and rendering that image data upon a substrate.

"Toner" refers to the wet or dry material that forms an image or text on a substrate. The terms ink and toner are used interchangeably to refer to this material.

"Magnetic ink" may refer to ink that is used in magnetic ink character recognition ("MICR"), a character recognition technology where MICR characters are printed with magnetic ink or toner. Positive additives to the magnetic ink or toner may include iron oxide.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A method for resolution conversion of Magnetic Ink Character Recognition (MICR) content in an image, the method being implemented in a computer system comprising one or more processors configured to execute one or more computer program modules, the method comprising:
   receiving, at a processor, image data of the image, the image data having a plurality of image planes in which one plane is a MICR image plane, wherein the plurality of image planes have essentially the same input resolution; and
   performing pattern-based conversion, using the processor, of the input resolution of the MICR image plane to an output resolution, the output resolution of the MICR image plane being essentially the same as a MICR print engine's resolution that is different from that of the remaining image planes,
   wherein the remaining image planes have the same input and output resolutions.

2. The method of claim 1, wherein the performing pattern-based conversion includes:
   comparing, using the processor, at least a portion of the MICR image plane to a plurality of reference bitmap image patterns stored in a look-up table, wherein each of the reference bitmap image patterns has a corresponding replacement bitmap image pattern stored in the look-up table; and
   substituting, using the processor, a replacement bitmap image pattern corresponding to the reference bitmap image pattern matching the portion of MICR image plane to output a corrected MICR image portion to be printed on a media by the MICR print engine.

3. The method of claim 2, wherein the MICR image plane includes one or more input MICR characters that are converted to one or more output MICR characters having the resolution of the MICR print engine.

4. The method of claim 2, wherein the MICR image plane is an empty MICR plane having no MICR characters.

5. The method of claim 4, wherein the empty MICR plane is converted to an empty output image plane having the MICR print engine resolution.

6. The method of claim 2, wherein the media is in the form of a continuous web capable of being moved at a plurality of different web speeds.

7. The method of claim 6, wherein the plurality of reference bitmap image patterns and its corresponding replacement bitmap image patterns are stored for each of the different web speeds.

8. The method of claim 6, wherein the corrected MICR image portion includes the replacement bitmap image pattern, which is corresponding to the reference bitmap image pattern matching the portion of MICR image plane, at a current operating web speed.

9. A system for resolution conversion of Magnetic Ink Character Recognition (MICR) content in an image, the system comprising:
   at least one processor configured to:
      receive image data of the image, the image data having a plurality of image planes in which one plane is a MICR image plane, wherein the plurality of image planes have essentially the same input resolution; and
      perform pattern-based conversion of the input resolution of the MICR image plane to an output resolution, the output resolution of the MICR image plane being essentially the same as a MICR print engine's resolution that is different from that of the remaining image planes,
      wherein the remaining image planes have the same input and output resolutions.

10. The system of claim 9, wherein the processor is further configured to:
    compare at least a portion of the MICR image plane to a plurality of reference bitmap image patterns stored in a look-up table, wherein each of the reference bitmap image patterns has a corresponding replacement bitmap image pattern stored in the look-up table; and
    substitute a replacement bitmap image pattern corresponding to the reference bitmap image pattern matching the portion of MICR image plane to output a corrected MICR image portion to be printed on a media by the MICR print engine.

11. The system of claim 10, wherein the MICR image plane includes one or more input MICR characters that are converted to one or more output MICR characters having the resolution of the MICR print engine.

12. The system of claim 10, wherein the media is in the form of a continuous web capable of being moved at a plurality of different web speeds.

13. The system of claim 12, wherein the plurality of reference bitmap image patterns and its corresponding replacement bitmap image patterns are stored for each of the different web speeds.

14. The system of claim 12, wherein the corrected MICR image portion includes the replacement bitmap image pattern, which is corresponding to the reference bitmap image pattern matching the portion of MICR image plane, at a current operating web speed.

15. The system of claim 10, wherein the look-up table includes a reference look-up table for storing the reference bitmap image patterns and a replacement look-up table for storing the replacement bitmap image patterns.

16. The system of claim 15, wherein the replacement bitmap image patterns are stored in the replacement look-up table for each of the four orientations.

17. The system of claim 15, wherein the replacement bitmap image patterns are stored in the replacement look-up table in one, two or four orientations depending on: whether or not the processor is configured to implement a rotation operation and whether or not an outgoing resolution of the MICR image plane is symmetric or asymmetric.

18. The system of claim 13, wherein the MICR characters in the replacement bitmap image patterns are custom tuned by modifying their pixel values so as to provide improved magnetic readability of the MICR characters at each web speed.

19. The system of claim 10, wherein the MICR image plane is an empty MICR plane having no MICR characters.

20. The system of claim 19, wherein the empty MICR plane is converted to an empty output image plane having the MICR print engine resolution.

21. The method of claim 1, wherein the input resolution of the MICR image plane is same as that of a solid inkjet print engine.

22. A method for resolution conversion of Magnetic Ink Character Recognition (MICR) content in an image, the method being implemented in a computer system comprising one or more processors configured to execute one or more computer program modules, the method comprising:

receiving, at a processor, image data of the image, the image data having a plurality of image planes in which one plane is a MICR image plane, wherein the plurality of image planes have essentially the same input resolution; and performing pattern-based conversion, using the processor, of the input resolution of the MICR image plane to an output resolution, the output resolution of the MICR image plane being essentially the same as a MICR print engine's resolution that is different from that of the remaining image planes, wherein the performing pattern-based conversion includes:

comparing, using the processor, at least a portion of the MICR image plane to a plurality of reference bitmap image patterns stored in a look-up table, wherein each of the reference bitmap image patterns has a corresponding replacement bitmap image pattern stored in the look-up table; and substituting, using the processor, a replacement bitmap image pattern corresponding to the reference bitmap image pattern matching the portion of MICR image plane to output a corrected MICR image portion to be printed on a media by the MICR print engine, wherein the MICR image plane includes one or more input MICR characters that are converted to one or more output MICR characters having the resolution of the MICR print engine, and wherein the size of the one or more input MICR characters is different from the size of the one or more output MICR characters.

23. A method for resolution conversion of Magnetic Ink Character Recognition (MICR) content in an image, the method being implemented in a computer system comprising one or more processors configured to execute one or more computer program modules, the method comprising:

receiving, at a processor, image data of the image, the image data having a plurality of image planes in which one plane is a MICR image plane, wherein the plurality of image planes have essentially the same input resolution; and performing pattern-based conversion, using the processor, of the input resolution of the MICR image plane to an output resolution, the output resolution of the MICR image plane being essentially the same as a MICR print engine's resolution that is different from that of the remaining image planes, wherein the performing pattern-based conversion includes:

comparing, using the processor, at least a portion of the MICR image plane to a plurality of reference bitmap image patterns stored in a look-up table, wherein each of the reference bitmap image patterns has a corresponding replacement bitmap image pattern stored in the look-up table; and substituting, using the processor, a replacement bitmap image pattern corresponding to the reference bitmap image pattern matching the portion of MICR image plane to output a corrected MICR image portion to be printed on a media by the MICR print engine, wherein the MICR image plane includes one or more input MICR characters that are converted to one or more output MICR characters having the resolution of the MICR print engine, and wherein the orientation of the one or more input MICR characters is different from the orientation of the one or more output MICR characters.

24. A method for resolution conversion of Magnetic Ink Character Recognition (MICR) content in an image, the method being implemented in a computer system comprising one or more processors configured to execute one or more computer program modules the method comprising:

receiving, at a processor, image data of the image, the image data having a plurality of image planes in which one plane is a MICR image plane, wherein the plurality of image planes have essentially the same input resolution; and performing pattern-based conversion, using the processor, of the input resolution of the MICR image plane to an output resolution, the output resolution of the MICR image plane being essentially the same as a MICR print engine's resolution that is different from that of the remaining image planes, wherein the performing pattern-based conversion includes:

comparing, using the processor, at least a portion of the MICR image plane to a plurality of reference bitmap image patterns stored in a look-up table, wherein each of the reference bitmap image patterns has a corresponding replacement bitmap image pattern stored in the look-up table; and substituting, using the processor, a replacement bitmap image pattern corresponding to the reference bitmap image pattern matching the portion of MICR image plane to output a corrected MICR image portion to be printed on a media by the MICR print engine, wherein the MICR image plane includes one or more input MICR characters that are converted to one or more output MICR characters having the resolution of the MICR print engine, and wherein the position of the one or more input MICR characters is different from the position of the one or more output MICR characters, and wherein the position of each MICR character includes x and y coordinates of the origin of the MICR character in a corresponding coordinate space.

25. The system of claim 9, wherein the input resolution of the MICR image plane is same as that of a solid inkjet print engine.

26. A system for resolution conversion of Magnetic Ink Character Recognition (MICR) content in an image, the system comprising:

at least one processor configured to:

receive image data of the image, the image data having a plurality of image planes in which one plane is a MICR image plane, wherein the plurality of image planes have essentially the same input resolution; and perform pattern-based conversion of the input resolution of the MICR image plane to an output resolution, the output resolution of the MICR image plane being essentially the same as a MICR print engine's resolution that is different from that of the remaining image planes, wherein the processor is further configured to:

compare at least a portion of the MICR image plane to a plurality of reference bitmap image patterns stored in a look-up table, wherein each of the reference bitmap image patterns has a corresponding replacement bitmap image pattern stored in the look-up table; and substitute a replacement bitmap image pattern corresponding to the reference bitmap image pattern matching the portion of MICR image plane to output a corrected MICR image portion to be printed on a media by the MICR print engine, wherein the MICR image lane includes one or more input MICR characters that are converted to one or more output MICR characters having the resolution of the MICR print engine wherein the size of the one or more input MICR characters is different from the size of the one or more output MICR characters.

27. A system for resolution conversion of Magnetic Ink Character Recognition (MICR) content in an image, the system comprising:

at least one processor configured to:
receive image data of the image, the image data having a plurality of image planes in which one plane is a MICR image plane, wherein the plurality of image planes have essentially the same input resolution; and perform pattern-based conversion of the input resolution of the MICR image plane to an output resolution, the output resolution of the MICR image plane being essentially the same as a MICR print engine's resolution that is different from that of the remaining image planes, wherein the processor is further configured to:

compare at least a portion of the MICR image plane to a plurality of reference bitmap image patterns stored in a look-up table, wherein each of the reference bitmap image patterns has a corresponding replacement bitmap image pattern stored in the look-up table; and substitute a replacement bitmap image pattern corresponding to the reference bitmap image pattern matching the portion of MICR image plane to output a corrected MICR image portion to be printed on a media by the MICR print engine, wherein the MICR image plane includes one or more input MICR characters that are converted to one or more output MICR characters having the resolution of the MICR print engine wherein the orientation of the one or more input MICR characters is different from the orientation of the one or more output MICR characters.

28. A system for resolution conversion of Magnetic Ink Character Recognition (MICR) content in an image, the system comprising:

at least one processor configured to:
receive image data of the image, the image data having a plurality of image planes in which one plane is a MICR image plane, wherein the plurality of image planes have essentially the same input resolution; and perform pattern-based conversion of the input resolution of the MICR image plane to an output resolution, the output resolution of the MICR image plane being essentially the same as a MICR print engine's resolution that is different from that of the remaining image planes, wherein the processor is further configured to:

compare at least a portion of the MICR image plane to a plurality of reference bitmap image patterns stored in a look-up table, wherein each of the reference bitmap image patterns has a corresponding replacement bitmap image pattern stored in the look-up table; and substitute a replacement bitmap image pattern corresponding to the reference bitmap image pattern matching the portion of MICR image plane to output a corrected MICR image portion to be printed on a media by the MICR print engine, wherein the MICR image plane includes one or more input MICR characters that are converted to one or more output MICR characters having the resolution of the MICR print engine wherein the position of the one or more input MICR characters is different from the position of the one or more output MICR characters, and wherein the position of each MICR character includes x and y coordinates of the origin of the MICR character in a corresponding coordinate space.

\* \* \* \* \*